J. ROBERTSON, Jr.
REPAIR PATCH FOR RUBBER FOOTWEAR.
APPLICATION FILED APR. 17, 1920.
1,354,846.  Patented Oct. 5, 1920.
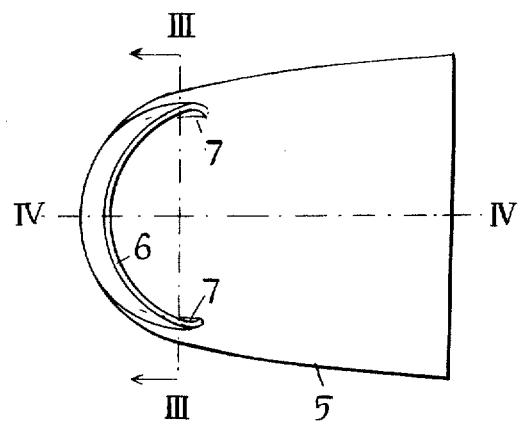
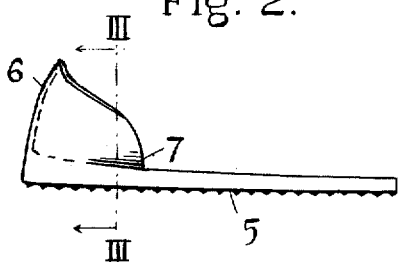
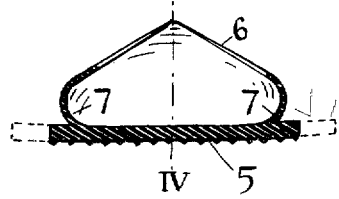
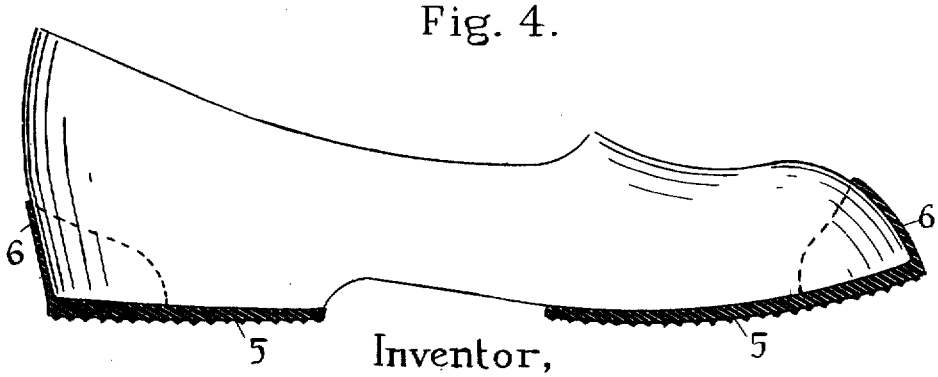
Inventor,
James Robertson, Jr.,
By Samuel W. Balch
Attorney.

UNITED STATES PATENT OFFICE.

JAMES ROBERTSON, JR., OF WEEHAWKEN, NEW JERSEY.

REPAIR-PATCH FOR RUBBER FOOTWEAR.

1,354,846.   Specification of Letters Patent.   Patented Oct. 5, 1920.

Application filed April 17, 1920. Serial No. 374,519.

*To all whom it may concern:*

Be it known that I, JAMES ROBERTSON, Jr., a citizen of the United States of America, residing at Weehawken, county of Hudson, and State of New Jersey, have invented new and useful Improvements in Repair-Patches for Rubber Footwear, of which the following is a specification.

This invention relates particularly to a repair patch applicable to the toe or heel of a rubber or overshoe, and the object is to provide a patch of such form that it may be applied to either the toe or heel, and to a considerable range of models and sizes so that the repair man is under the necessity of having in hand only a limited number of different sizes of repair patches in order to be prepared to repair any size or model of rubber or overshoe that may be offered. A further object is to provide a form of repair patch that may be applied expeditiously and in a substantial and workmanlike manner.

In the accompanying sheet of drawings which forms a part of this application—

Figure 1 is a top view of a repair patch according to this invention.

Fig. 2 is a side view of the same.

Fig. 3 is a section on the line III—III of Figs. 1 and 2.

Fig. 4 shows a patch applied to both the heel and toe of a rubber, the patch being in section on the line IV—IV of Figs. 1 and 3.

The repair patch is preferably a single molded piece of rubber and comprises a heavy tread portion 5 with a thickness, for example, of from an eighth to three-sixteenths of an inch so as to stand considerable wear. This thickness is such that it is comparatively inelastic. This portion is rounded at one end and is of sufficient area to cover all of the heel or as much of the sole as it is desired to cover. Upstanding from the rounded end of the tread portion is a flange 6 which curves over the tread portion. The flange at the bottom margins 7, 7 of its ends is sharply incurved and joins to the tread portion at a distance from the margin of the tread portion. In consequence of the manner of joining the repair patch can be fitted to a rubber or overshoe which has a heel or toe with a width equal to the distance between the points of joining of the incurved margins with the tread portion, or which has a greater width, and the flange can be bent into contact with the sides of the rubber when it is narrow, or, when the heel or sole is wide the incurved bottom margin may be rolled out to accommodate the greater width. When applied at the heel the upper edge of the flange will be somewhat stretched and the flange bent back. When applied at the toe the flange may need to be curved somewhat more than its normal form.

By reason of the flange being curved over the tread portion and also being thin flexible and elastic it can be turned inside out and rolled under the tread, and when this is done it will not spring back of its own accord.

In preparation for applying, the flange is first turned under the tread and cement is applied to all of the surfaces of the repair patch and of the rubber or overshoe which are to come together and the cement allowed to dry. The tread is then applied to the heel or sole with the flange still rolled back and after applying, the counter is rolled up into place. After applying, any portions of the tread which project beyond the heel or sole are trimmed off.

What I claim as new, and desire to secure by Letters Patent of the United States, is—

1. A repair patch for footwear comprising a tread portion rounded at one end and having a flexible and elastic flange upstanding from the rounded end of the tread portion and curved over the tread portion, substantially as described.

2. A repair patch for footwear comprising a tread portion rounded at one end and having a flexible and elastic flange upstanding from the rounded end of the tread portion and having the bottom margins at its ends incurved and joined to the tread portion at a distance from the margin of the tread portion, substantially as described.

3. A repair patch for footwear comprising a tread portion rounded at one end and having a flexible and elastic flange upstanding from the rounded end of the tread portion and curved over the tread portion and having the bottom margins at its ends incurved and joined to the tread portion at a distance from the margin of the tread portion, substantially as described.

Signed at New York, N. Y., this 16th day of April, 1920.

JAMES ROBERTSON, JR.